United States Patent [19]

Talak et al.

[11] 3,854,559

[45] Dec. 17, 1974

[54] CONTROL SYSTEM FOR A HYDRAULICALLY-OPERABLE BRAKE AND TRANSMISSION

[75] Inventors: John Frank Talak; John Lester Hobson, both of Dubuque, Iowa

[73] Assignee: Deere & Company, Moline, Ill.

[22] Filed: Oct. 1, 1973

[21] Appl. No.: 402,395

[52] U.S. Cl............... 192/4 A, 192/4 B, 192/103 F, 303/71
[51] Int. Cl............................................ B60k 29/02
[58] Field of Search ........... 192/4 A, 4 B, 4 C, 13 R

[56] References Cited
UNITED STATES PATENTS

| | | | |
|---|---|---|---|
| 2,968,967 | 1/1961 | Ross................................. | 192/4 A X |
| 3,458,018 | 7/1969 | Shore................................. | 192/4 C |
| 3,565,220 | 2/1971 | Lammers et al. ............... | 192/13 R X |
| 3,589,484 | 6/1971 | Lammers et al................... | 192/4 A |
| 3,635,317 | 1/1972 | Crabb................................. | 192/4 A |
| 3,645,368 | 2/1972 | Blaauw............................... | 192/4 B |

Primary Examiner—Benjamin W. Wyche

[57] ABSTRACT

A motor vehicle includes a hydraulically-operated transmission means and a hydraulically operated brake means which are controlled through means of an interlocked control system. The brake means is normally engaged in the absence of fluid pressure and a pump serves both as the charging pump for the fluid pressure to operate the transmission means and as the fluid supply pump for actuating the brake means. The control system includes a valve arrangement for disengaging the transmission means and applying the brake means at any time when transmission charge pressure drops to a predetermined level. The valve arrangement also provides for disengaging the transmission at any time that the service brake is applied. The valve arrangement further provides for releasing the brake means, in response to a manual actuation of a master cylinder, for permitting the vehicle to be towed or otherwise moved when the engine is inoperative.

12 Claims, 3 Drawing Figures

3,854,559

CONTROL SYSTEM FOR A HYDRAULICALLY-OPERABLE BRAKE AND TRANSMISSION

BACKGROUND OF THE INVENTION

The present invention relates to an interlocked control means for hydraulically controllable brake and transmission means.

Prior art control systems are known which interlock the control of transmission and brake means of a vehicle such that the transmission is neutralized whenever the brake means is engaged. Many of these control systems suffer from the disadvantage that the neutralizing of the transmission is initiated through movement of a brake pedal or the like. Thus, if the engine of the vehicle should start to stall out due to loads imposed upon the vehicle while the latter is on a steep incline, the engine may in fact stall out and the vehicle may begin to "run away" before the operator is able to disengage the transmission to relieve the load on the engine and before he is able to apply the brakes.

SUMMARY OF THE INVENTION

Accordingly, it is a main object of the present invention to provide an interlocked control system for controlling the operation of hydraulically-controllable vehicle brake means and transmission means, the control system not only acting to neutralize the transmission means when the brake means is engaged but also acting to neutralize the transmission means when the delivery pressure of the charge pump, which supplies fluid to the transmission means, falls below a predetermined level.

A further object of the invention is to provide a control system which includes manually operable means for supplying operating fluid to the brake means to disengage the same when the vehicle engine is stopped and it is necessary to tow or otherwise move the vehicle.

The foregoing objects are accomplished through a control system which includes a charge pump having its outlet connected both to hydraulically controllable transmission means and hydraulically controllable brake means, the latter being normally engaged in the absence of fluid pressure. A manually operable brake control valve is connected in the system so as to connect the charge pump outlet to a sump when it is desired to actuate the brake means into braking engagement. A pilot-operable transmission fluid dump valve is connected so as to be subject to the pressure delivered by the charge pump and is responsive to a predetermined minimum output pressure of the charge pump to connect the transmission operating fluid to the sump to thus neutralize the transmission means. A manually operable master cylinder assembly is connected in the systems and is selectively operable to supply fluid pressure to the brake means to disengage the same when the charge pump is inoperative.

The objects appearing above and further objects will become apparent from the ensuing description and the appended drawings.

DESCRIPTION OF THE PREFERRED EMBODIMENT

Figure 1:
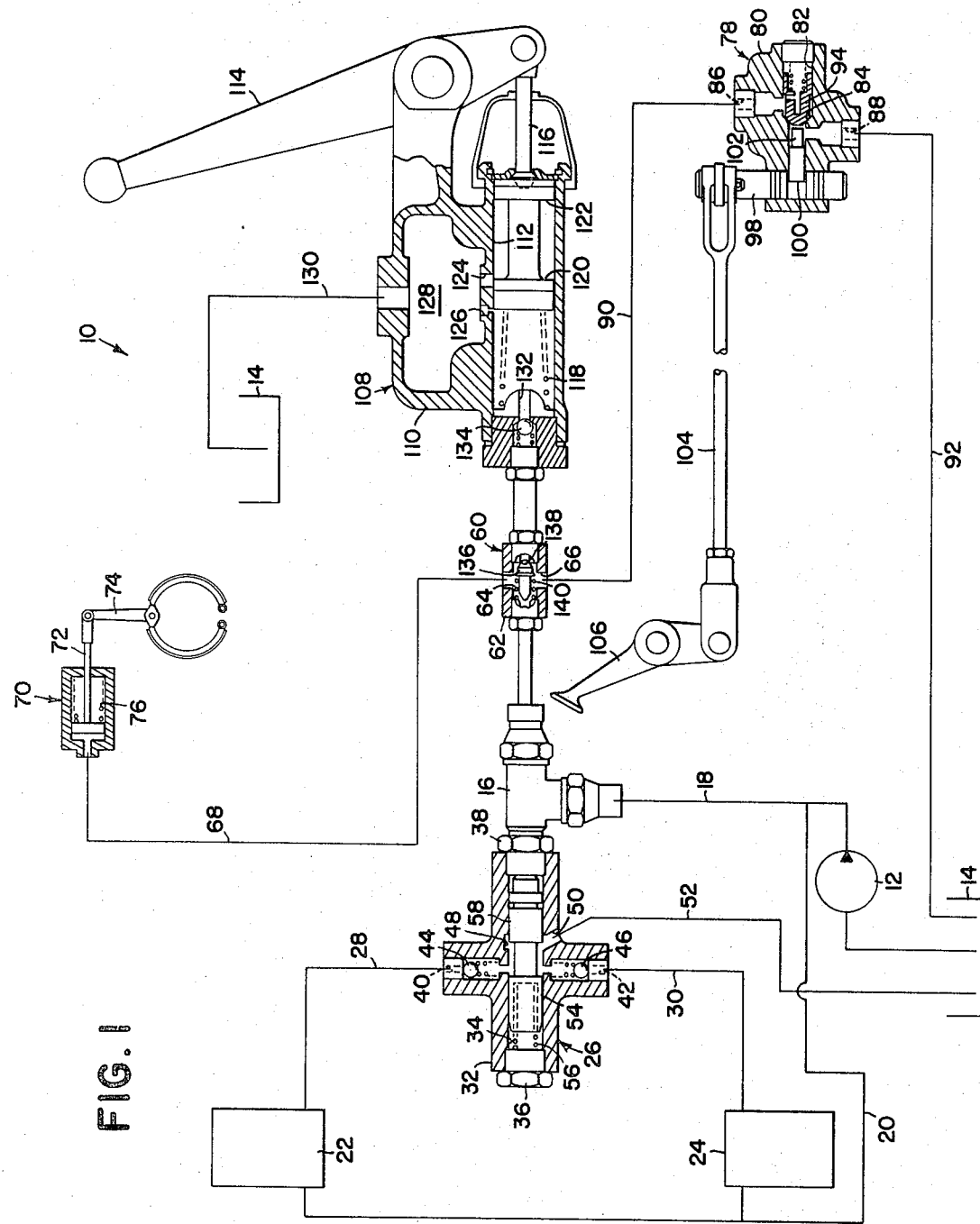
FIG. 1 shows a schematic of the control system of the present invention with parts of the system components being shown in section, the system components and their relative positions being that which they occupy when the vehicle engine is inoperative.

Referring now to the drawings, therein is shown a control system constructed according to the principles of the present invention and indicated in its entirety by the reference numeral 10. The control system 10 is driven in a conventional manner (not shown) by the vehicle engine and includes a charge pump 12 having its inlet connected to a sump 14 and having its outlet connected to a tee connection 16 through means of a conduit 18 and to hydraulically operable transmission means, through means of a conduit 20, the transmission means being here shown functionally as right- and left-hand hydrostatic transmission units represented by the boxes 22 and 24, respectively. It is to be understood that normally further components such as a relief valve and an additional pump would be located in the conduit 20; however, these components have been omitted for brevity. Further, it is to be understood that for the purposes of this invention the transmission means could just as well be represented as a hydraulically operable clutch or valve or like component which, when subjected to hydraulic fluid pressure, is capable of directly or indirectly controlling a vehicle transmission.

Figure 2:
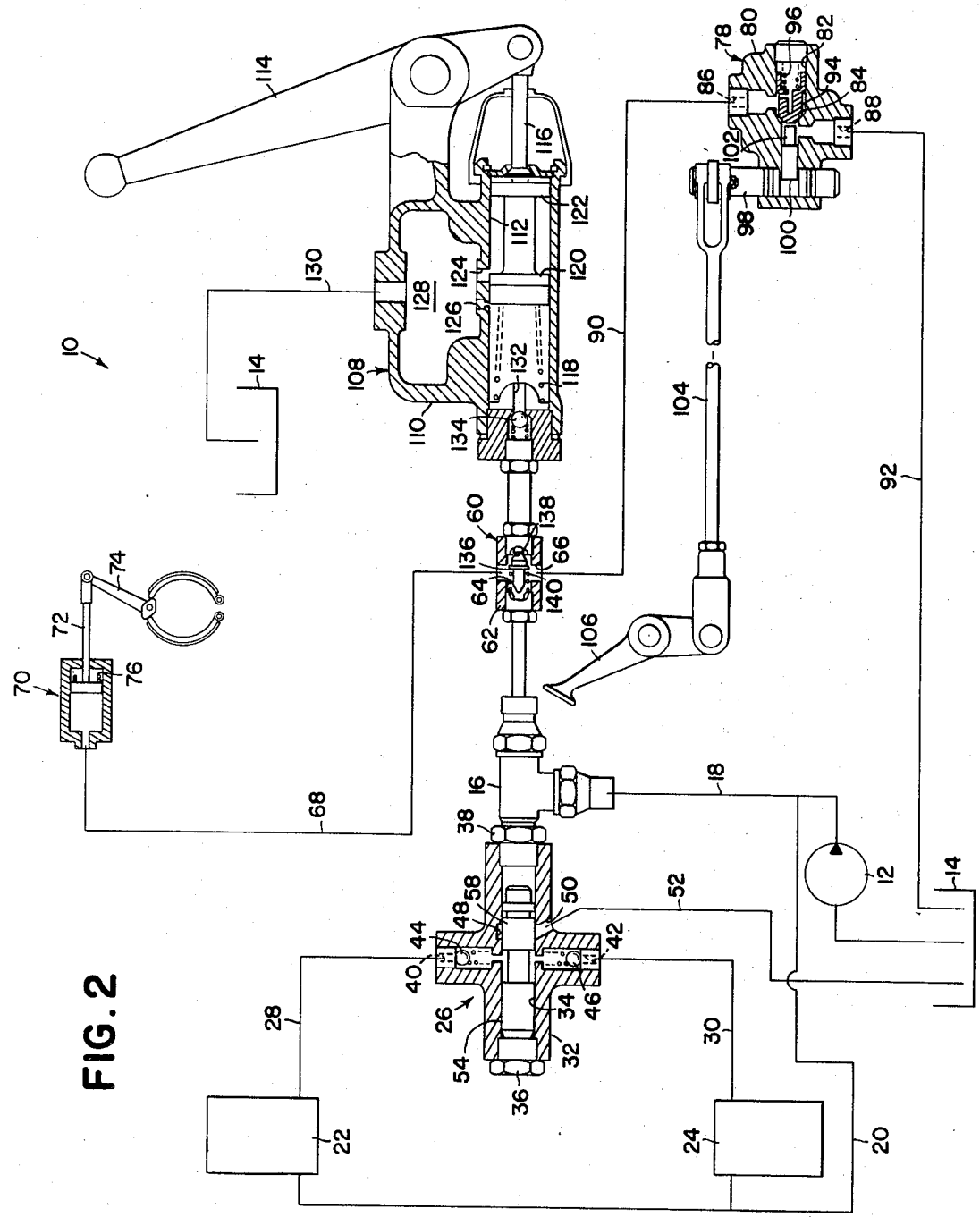
FIG. 2 is a view similar to FIG. 1 but showing the system components and their relative positions when the vehicle engine is running and the brake means is released.
Figure 3:
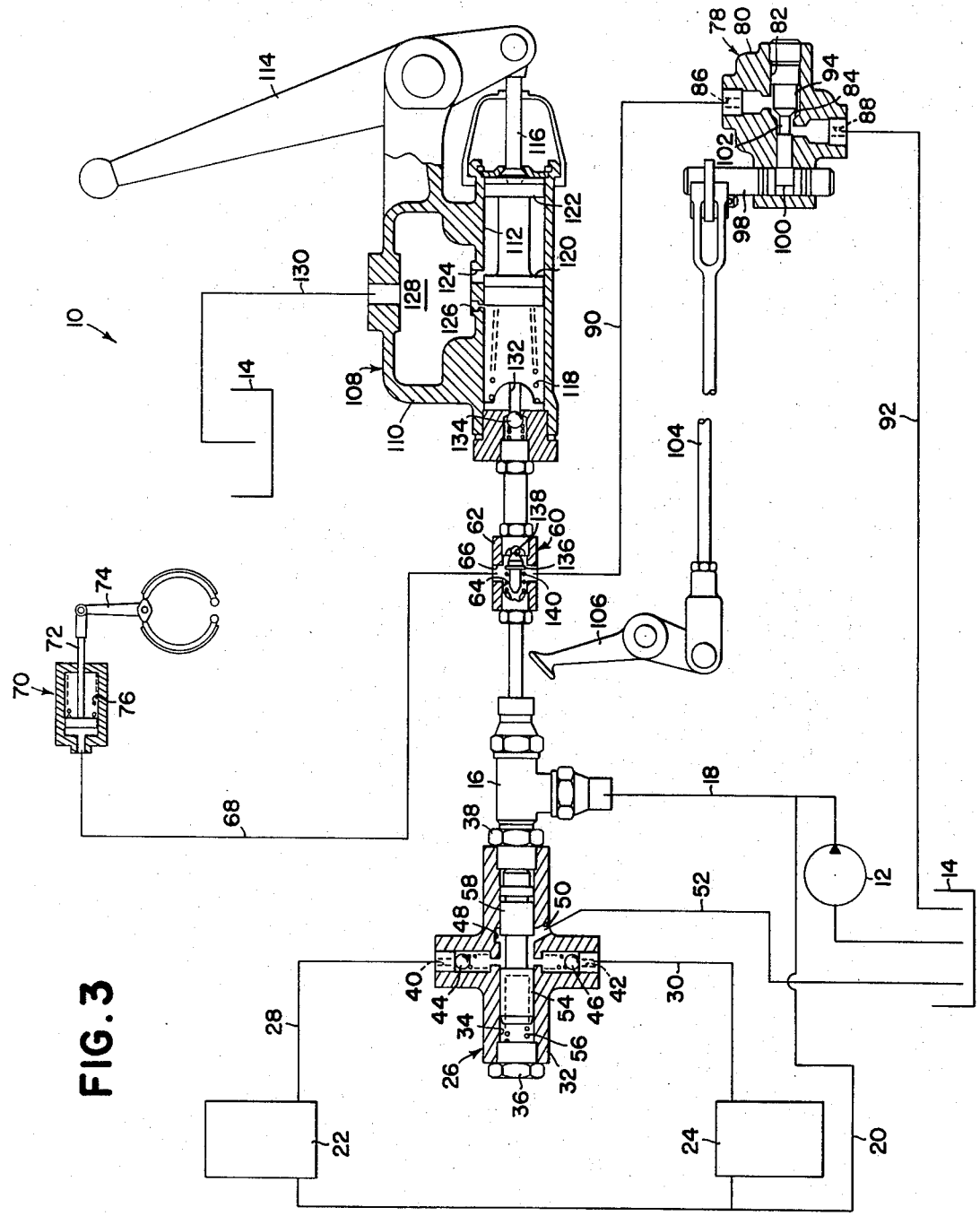
FIG. 3 is a view similar to FIG. 1 but showing the system components and their relative positions when the vehicle engine is running and the brake means is applied.

Provided for routing working fluid pressure away from the transmission units 22 and 24 is a pilot-operated dump valve 26 to which the working fluid of the transmission units 22 and 24 is connected through means of conduits 28 and 30, respectively. The dump valve 26 includes a valve body 32 having a longitudinal valve bore 34 located therein, the valve bore 34 having its left end closed by a cap 36 and having a pilot port defined by its right end and coupled, as at 38, to one branch of the tee connection 16. The conduits 28 and 30 leading from the transmission units are connected in fluid communication with the valve bore 34 through means of ports 40 and 42, respectively, the ports 40 and 42 respectively having check valve assemblies 44 and 46 located therein for preventing fluid from draining from the transmission units to sump when the transmission units are neutralized. The valve bore 34 includes an annular recess 48 which is spaced rightwardly from the ports 40 and 42 and which is connected to the sump 14 through means of a port 50 and conduit 52. For the purpose of controlling the flow of fluid between the ports 40 and 42 and the port 50, a valve spool 54 is reciprocably mounted in the valve bore 34. A coil compression spring 56 acts between the bore cap 36 and the left end of the valve spool 54 so as to urge it to a normally open position, as shown in FIGS. 1 and 3, wherein a land 58 thereof is positioned so as to permit the flow of fluid from the ports 40 and 42 to the port 50 and thence to the sump via the conduit 52. However, when the charge pump 12 is operating so as to deliver fluid pressure above a predetermined minimum, the pressure acts upon the right end of the valve spool to shift it leftwardly, as shown in FIG. 2, so as to block the flow of fluid between the ports 40 and 42 and the port 50.

The control system 10 further includes a poppet valve assembly 60, having a function to be described below, including a valve body 62 in which is located intersecting passages 64 and 66, respectively, the left end of the passage 64 being coupled to the tee connection 16 and the upper end of the passage 66 being connected, via a conduit 68, to one end of the cylinder of a one-way extensible and retractable hydraulic motor 70 forming part of a brake means and including a piston and rod element 72 subjected at its left-hand end to the fluid pressure from the conduit 68 and having its right-hand end connected to a camming mechanism, indicated schematically at 74, having the function of controlling brake shoe means of the brake maens into and out of braking engagement. Acting on the piston and rod element in opposition to the fluid pressure acting on the left-hand end thereof is a compression coil spring 76 which acts to normally dispose the camming mechanism such that the brake shoe means will be in braking engagement, as shown in FIGS. 1 and 3. It is to be understood that the vehicle brake means would normally include at least a pair of brakes; however, only one brake is shown and described here for the sake of brevity. In any event, the brake means is controlled through means of a brake control valve 78 including a valve body 80 in which is located a valve bore 82 defining a rightwardly facing annular valve seat 84. Inlet and outlet ports 86 and 88, respectively, intersect the valve bore at respective locations rightwardly and leftwardly of the valve seat 84 and are respectively connected by means of conduits 90 and 92 to the bottom end of the passage 66 of the poppet valve 60 and to the sump 14. A poppet valve element 94 is shiftably mounted in the bore 82 and is biased leftwardly, via a compression coil spring 96, to a normally closed position against the seat 84, as shown in FIGS. 1 and 2, wherein the flow of fluid from the charge pump 12 and the hydraulic motor 70 of the brake means is blocked from the sump 14. A manually operated control means is provided for shifting the poppet valve element 94 rightwardly to an open position permitting the flow of fluid between the inlet and outlet ports 86 and 88, the control means comprising a control shaft 98 rotatably mounted in the valve body 80 and including a camming portion 100 for selectively shifting a pin 102 that is reciprocably mounted in the valve bore 82. The control means further comprises a control link or rod 104 having its opposite ends respectively connected to the shaft 98 and a pedal or lever 106.

For the purpose of supplying pressure fluid to the hydraulic motor 70 for actuating the latter to release the brake means at such times when the charge pump 12 is inoperative, there is provided a manually operable pump here shown as a conventional master cylinder 108. The master cylinder 108 includes a body 110 having a cylinder bore 112 therein and having a manually operable lever 114 pivotally connected thereto and to the rod end of a piston and rod element 116 which is reciprocably mounted in the bore 112 and which has a coil compression spring 118 acting upon its left end to dispose the same in a normally released condition as shown in the drawings. The piston and rod assembly 116 includes spaced leading and trailing pistons 120 and 122, respectively, which, when the piston and rod element is located in its released condition, are positioned such that the right- and left-hand faces of the leading piston are exposed to fluid exhaust and supply ports 124 and 126, respectively, communicating the bore 112 with a reservoir 128 which is connected to the sump 14 through means of a conduit 130. Formed in the body 110 at the left end of the cylinder bore 112 is a fluid outlet 132 which is connected to the right end of the passage 64 of the poppet valve 60 and in which is mounted a check valve assembly for preventing the flow of fluid in the direction of the cylinder bore 112 from the poppet valve 60. For positively ensuring that fluid will not leak past the check valve assembly 134 in the direction of the reservoir 128 of the master cylinder 108, the poppet valve 60 includes a poppet valve element 136 which is biased rightwardly against an annular valve seat 138 by means of a coil compression spring 140.

The operation of the control system is as follows. Assuming the vehicle engine to be stopped, the components of the control system 10 will be in their positions illustrated in FIG. 1. Thus, with no pressure being supplied by the engine driven charge pump 12, the hydraulic motor 70 of the brake means will be deactivated and the brake shoes of the brake means will be held engaged through the action of the camming mechanism 74 as effected by the coil compression spring 76. If it is then desired to tow or otherwise move the vehicle while the engine thereof is stopped, it is necessary only for the operator to actuate the master cylinder 108 by pivoting the lever 114 clockwise from its normally released position illustrated in the drawings, so as to shift the piston and rod element 116 leftwardly in the cylinder bore 112. Prior to this shifting, the bore portion to the left of the leading piston 120 will have filled full of fluid and leftward movement of the leading piston 120 will first cause the check valve assembly 134 to unseat and then cause the poppet valve element 136 to become unseated. The fluid then passes to the hydraulic motor 70. If this fluid is insufficient to cause actuation of the hydraulic motor 70, the lever 114 may be "pumped" until sufficient fluid is supplied. Once the hydraulic motor is actuated such that the piston and rod element 72 shifts rightwardly to the position shown in FIG. 2, the brake shoe means will be released such that the vehicle may be moved.

When the vehicle engine is started, the control system will assume the condition shown in FIG. 2. Thus, the pressure of the fluid delivered by the charge pump 12 will act to hold the valve spool 54 of the dump valve 26 in its closed leftward position wherein the working fluid of the transmission units 22 and 24 is blocked from flowing to the sump 14. Selective operation of the transmission units 22 and 24 then may be accomplished through control means (not shown). At the same time, the pressure of the fluid delivered by the charge pump 12 will act upon the piston and rod element 72 of the hydraulic motor 70 such that the latter will be shifted rightwardly to effect movement of the camming mechanism which in turn holds the brake shoe means in a released condition. If the operator then wishes to stop the vehicle by engaging the brakes thereof, he need only to actuate the brake control valve 78 by rotating the pedal or lever 106 so as to cause the camming portion 100 of the control shaft 98 to engage the pin 102 and shift the latter rightwardly into shifting engagement with the poppet valve element 94 to thus unseat the latter. The actuating fluid of the hydraulic motor 70 of the brake means and the fluid being delivered by the charge pump 12 are then both connected to the sump 14. With this state of affairs, the pressure at the right end of the valve spool 54 of the dump valve 26 is insufficient to overcome the force of the spring 56 and the valve spool 54 then shifts rightwardly to its normally open position, as shown in FIG. 3. If the hydrostatic transmission units 22 and 24 are then in a condition of operation, the working fluid pressure thereof will normally be sufficient to unseat the check balls of the check valve elements 44 and 46 and will pass therethrough to the sump connected port 50 to thus neutralize the transmission units.

Assuming the control system components to be in their respective positions shown in FIG. 2, which correspond to the condition of the system during normal operation of the vehicle, and that the engine suddenly begins to stall out or otherwise lose power, the charge pump 12 will correspondingly begin to lose power since it is driven by the vehicle engine and thus the pressure of the fluid delivered thereby will also drop. Once this pressure has dropped to a predetermined minimum, the spring 56 of the dump valve 26 will shift the valve spool 54 rightwardly so as to again neutralize the transmission means as aforedescribed. This neutralization of the transmission means may happen quick enough to prevent the complete stalling of the engine and, in any event, will happen automatically so that the operator's attention may be concentrated on operations other than that of disengaging the transmission means.

We claim:

1. A hydraulic brake and transmission control system comprising: a vehicle brake means; biasing means connected to said brake means for normally holding said brake means in an engaged condition; one-way hydraulic motor means connected to said brake means and pressure actuatable for moving said brake means to a disengaged condition against the force of said biasing means; a hydraulic fluid conduit means connected to said motor means and including first and second branch means; a vehicle engine-driven pump having an outlet connected to the first branch means; a sump connected to the second branch means; a normally closed brake control valve means located solely in said second branch means and shiftable to simultaneously connect the motor means and said pump to sump to thereby permit the brake means to become engaged by the action of said biasing means; actuator means for selectively shifting said brake control valve means to an open position from its closed position; a hydraulically operable transmission means; a return conduit means including a normally open pilot-operable dump valve means connecting said transmission means to said sump; a pressure fluid supply conduit means connecting said outlet of the pump to said transmission means exclusive of said dump valve means; said dump valve means being connected to said outlet of the pump and operative in response to the pressure fluid delivered by said pump being above a pre-determined minimum, indicative of normal vehicle engine operation, to block the flow of fluid between said transmission means and said sump, whereby said transmission means will be deactivated both when said brake control valve means is shifted to said open position and when the pump is driven too slowly by the vehicle engine to supply said pre-determined minimum pressure, as when the engine is stalling.

2. The hydraulic brake and transmission control system defined in claim 1 and further including a manually operable pump means having an inlet connected to said sump and having an outlet connected to said hydraulic fluid conduit means between said brake means and said brake control valve means; and a check valve means being located in said hydraulic fluid conduit means between the outlet of said pump means and said pump and hydraulic motor means and operable in response to fluid pressure delivered by said pump means to move from a normally closed position, wherein the flow of fluid from the conduit means to the pump means is blocked, to an open position, wherein the flow of fluid from said pump means to said motor means is permitted.

3. The hydraulic brake and transmission assembly defined in claim 1 wherein said dump valve means is a spool valve having a body in which is located a valve bore; said bore having separate connections with said transmission means and said sump and containing a reciprocably mounted valve spool element; biasing means uring said spool element towards a normal position connecting said transmission means to said sump; and said bore being connected to said conduit means such that fluid pressure in said conduit means acts on the spool element in a direction opposite to that of the biasing means.

4. The hydraulic brake and transmission assembly defined in claim 2 wherein said pump means is a master cylinder assembly including a piston reciprocably mounted in a cylinder bore and connected to a lever for selectively shifting the same; said sump being connected to said cylinder bore so as to admit fluid on opposite sides of the piston when the latter is in a normally released position; and a biasing means acting on said piston in a direction tending to maintain it in said normally released position.

5. The hydraulic brake and transmission control system defined in claim 2 wherein said check valve means includes a valve body containing fluid passages forming an intersection of said conduit means at the branching point of said first and second branch means and the connection of the outlet of said pump means with said conduit means.

6. The hydraulic brake and transmission control system defined in claim 1 wherein said brake control valve means includes a normally seated poppet valve element; and manually operable cam means being mounted for selectively unseating said poppet valve element.

7. A hydraulic brake and transmission control system comprising: a normally engaged vehicle brake means; a fluid pressure operable actuator means connected to said brake means for selectively releasing the latter; a pump having an inlet connected to a sump and an outlet connected to said actuator means; said outlet also being connected to said sump through brake control valve means including a normally closed valve means acting to block the flow of fluid between the pump outlet and the sump; a manually operable actuator means connected to said brake control valve means for selectively effecting an open condition therein; fluid operable transmission means including actuating fluid passage means connected to said sump by means including a normally open pilot-operated dump valve means; said pump outlet also being connected to said fluid-operable transmission means, exclusive of said dump valve means and to a pilot port of said dump valve means, the dump valve means being responsive to a pre-determined minimum pressure of the fluid delivered by said pump at said pilot port to block the flow of fluid between the actuating fluid passage means of said transmission means and the sump, whereby fluid pressure will be available to operate said transmission, when the pump is operative to deliver said minimum pressure, until said normally closed brake control valve means is opened to connect the pump to the sump thus resulting in a pressure drop at said dump valve means, the latter then acting to connect the transmission means operating fluid to sump.

8. The hydraulic brake and transmission control system defined in claim 7 and further including a manually operable pump means having an inlet connected to said sump and having an outlet connected to said actuator means; and a check valve means being located between the outlet of said pump means and said actuator means and operable in response to fluid pressure delivered by said pump means to move from a normally closed position, wherein the flow of fluid from the pump means outlet to the actuator means is blocked, to an open position, wherein the flow of fluid from said pump means outlet to said actuator is permitted.

9. The hydraulic brake and transmission assembly defined in claim 7 wherein said dump valve means is a spool valve having a body in which is located a valve bore; said bore having separate connections with said transmission means and said sump and containing a reciprocably mounted valve spool element; biasing means urging said spool element towards a normal position connecting said transmission means to said sump; and said bore being connected to said pump outlet such that fluid pressure delivered by said pump acts on the spool element in a direction opposite to that of the biasing means.

10. The hydraulic brake and transmission assembly defined in claim 8 wherein said pump means is a master cylinder assembly including a piston reciprocably mounted in a cylinder bore and connected to a lever for selectively shifting the same; said sump being connected to said cylinder bore so as to admit fluid on opposite sides of the piston when the latter is in a normally released position; and a biasing means acting on said piston in a direction tending to maintain it in said normally released position.

11. The hydraulic brake and transmission control system defined in claim 8 wherein said check valve means includes a valve body containing fluid passages forming an intersection of conduit means connecting the pump outlet to the actuator means and brake control valve means.

12. The hydraulic brake and transmission control system defined in claim 7 wherein said brake control valve means includes a normally seated poppet valve element; and manually operable cam means being mounted for selectively unseating said poppet valve element.

* * * * *